(No Model.)
W. M. McGEHEE.
SEEDING MACHINE.
No. 302,511. Patented July 22, 1884.
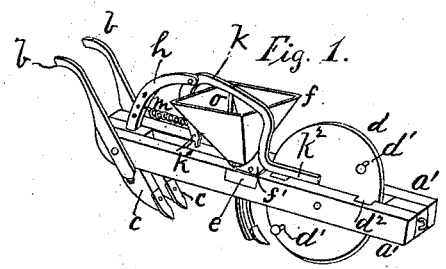
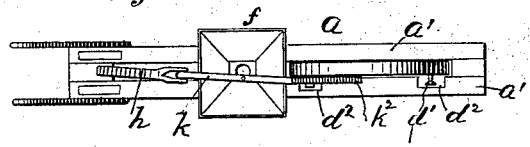
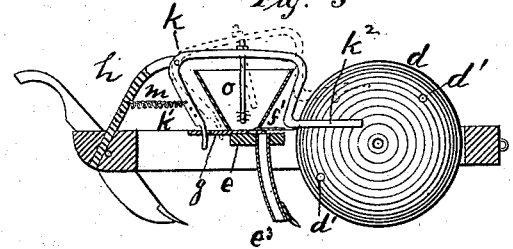
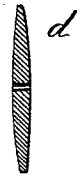
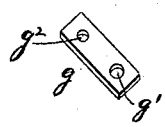 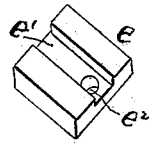 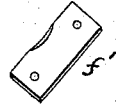
Witnesses.
O. M. Kramer
P. B. Turpin
Inventor.
William M. McGehee
By R. S. & A. P. Lacey
Attys

UNITED STATES PATENT OFFICE.

WILLIAM M. McGEHEE, OF GREENVILLE, ALABAMA.

SEEDING-MACHINE.

SPECIFICATION forming part of Letters Patent No. 302,511, dated July 22, 1884.

Application filed April 1, 1884. (No model.)

*To all whom it may concern:*

Be it known that I, WILLIAM M. MCGEHEE, a citizen of the United States, residing at Greenville, in the county of Butler and State of Alabama, have invented certain new and useful Improvements in Seeding - Machines; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to improvements in seeding-machines in which the seed is dropped from a hopper to the ground, and in which the dropping of the seed is effected by means of a dropping-slide.

The invention, though adapted particularly to the planting of corn, yet may be employed for planting many other kinds of seed.

The invention consists in the construction, arrangement, and combination of parts hereinafter fully described.

In the drawings, Figure 1 is a perspective. Fig. 2 is a plan. Fig. 3 is a longitudinal section on line $x\ x$, Fig. 2. Fig. 4 is dropping-slide. Fig. 5 is a view of the upper side of the cross-bar in which dropping-slide operates. Fig. 6 shows the cut-off plate, and Fig. 7 is a vertical section of the pilot-wheel.

The main frame $a$ is composed of the two parallel side beams, $a'\ a'$, arranged near together and suitably united at their ends. The handles $b\ b$ and standards $c\ c$ are attached to the rear ends of the side beams. The standards, with their shovels, are arranged to run on opposite sides of the open furrow and throw the earth inward and cover the grain. The pilot-wheel $d$ is journaled between the forward ends of the beams, and has its convex faces touching the side beams, whereby it is held steadily in place and prevented from turning with a wabbling movement. One or more small pins, $d'$, are projected from one of the faces of the pilot-wheel, and are arranged to engage and lift the end of the dropping-lever. Small approximately vertical mortises $d^2$ are cut in one of the side bars, to permit the passage of the pins $d'$ as the pilot-wheel revolves. A supporting cross-bar, $e$, is arranged just in rear of the pilot-wheel, and is provided with a longitudinal channel, $e'$, adapted to receive and permit the free movement of the dropping-slide. A discharge-opening, $e^2$, is formed through its forward part, to permit the seed to drop into the boot $e^3$, through which the grain is conveyed to the furrow. The hopper $f$ is secured in position over the slide-channel $e'$, just in rear of the discharge-opening $e^2$. The forward end of the slide-channel is covered by a thin cut-off plate, $f'$, the rear edge of which is slightly beveled, and serves as a gage to regulate the quantity of grain taken in by the seed-opening in the dropping-slide. The dropping-slide $g$ is provided in its forward end with a seed-opening, $g'$, and in its rear end, which projects out of the slide-channel, it has an opening, $g^2$, to receive the end of the dropping-lever. A supporting-arm, $h$, has one end fixed to the main frame, and its other end carried upward to a point near to and preferably a little above the plane of the top of the hopper $f$. An inverted-U-shaped dropping-lever, $k$, is pivoted to the upper end of the arm $h$. The wing $k'$ of the dropping-lever extends down alongside the hopper, and passes through and plays in the opening $g^2$ in the dropping-slide. From its pivotal attachment the lever $k$ is carried over the top of the hopper and down near the front side thereof till it reaches the frame $a$, and it is then bent forward, so as to provide the engaging finger or extension $k^2$, which lies close to the face of the pilot-wheel and in position to be engaged and lifted by the pin or pins $d'$. When the lever is lifted by one of the pins $d'$, the dropping-slide is thrown forward and the grain is dropped into the boot. When the pin clears the end of the finger $k^2$, the lever drops and draws the slide back and brings the seed-opening into the hopper.

In order to prevent accident, a retracting-spring, $m$, is provided, arranged as shown, by which the return movement of the dropping-lever is greatly facilitated. This spring may be adjusted by means of the several holes shown in arm $k'$ and arm $h$, whereby the tension on the lever can be increased or lessened. The spring could be constructed and arranged to act on the forward end of the dropping-lever; but I prefer to put it at the place shown. Ordinarily the gravity of the dropping-lever is sufficient to cause its return after having been lifted by the pilot-wheel. Instead of the spring shown, a weight might be secured upon the forward end of the lever; but this would not be so convenient as the spring; hence I employ the latter. I have also provided a stirrer, o, which is attached to the dropping-lever and extends down into the hopper, and is very useful with some kinds of seed which tend to get compacted in the bottom of the hopper. The stirrer is so attached that it may be removed when desired.

Having described my invention, what I claim, and desire to secure by Letters Patent, is—

1. The combination, with the hopper and the pilot-wheel arranged in front thereof, of the dropping-bar pivoted in rear of the hopper, and having one arm extended down to and connected with the dropping-slide and its other arm extended over the hopper in position to be engaged by the pilot-wheel, said wheel being adapted to actuate the said forward arm at intervals, substantially as and for the purposes specified.

2. The combination, with the pivoted dropping-bar having its rear end engaged with the grain or dropping slide and its other end extended over the top of the hopper, of a stirrer having one end attached to the dropping-bar and its other end carried down into the hopper, substantially as and for the purposes set forth.

3. The combination, with the main frame, the grain-slide, and the pilot-wheel, of the standard or arm $h$, the dropping-bar pivoted to the arm $h$, and having one of its ends extended downward and engaged with the grain-slide, and its other end extended over the top of the hopper and alongside of the pilot-wheel, and a retracting-spring adapted to draw the dropping-bar back to its normal position after it has been raised by the pilot-wheel, substantially as set forth.

In testimony whereof I affix my signature in presence of two witnesses.

WILLIAM M. McGEHEE.

Witnesses:
J. M. STEINER,
A. W. METCALF.